US006697960B1

(12) United States Patent
Clark et al.

(10) Patent No.: US 6,697,960 B1
(45) Date of Patent: Feb. 24, 2004

(54) METHOD AND SYSTEM FOR RECOVERING DATA TO MAINTAIN BUSINESS CONTINUITY

(75) Inventors: Barry A. Clark, Fort Lee, NJ (US); Charlie Durant, Bear, DE (US); David Francis, New Castle, DE (US); John Lampinen, Wilmington, DE (US); Dennis Malarkey, Phoenix, AZ (US), by Thomas Malarkey, legal representative; Frank Zemanik, Cherry Hill, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/559,136

(22) Filed: Apr. 27, 2000

Related U.S. Application Data (60) Provisional application No. 60/131,565, filed on Apr. 29, 1999.

(51) Int. Cl.[7] .................................................. G06F 11/00
(52) U.S. Cl. .............................................. 714/15; 714/6
(58) Field of Search ............................ 714/5, 6, 7, 13, 714/15, 20; 711/162

(56) References Cited

U.S. PATENT DOCUMENTS

| 5,379,418 A | * | 1/1995 | Shimazaki et al. | ............ 714/11 |
| 5,412,801 A | | 5/1995 | de Remer et al. | ............ 395/575 |
| 5,434,994 A | | 7/1995 | Shaheen et al. | ............ 395/500 |
| 5,515,499 A | | 5/1996 | Allen et al. | ............ 395/182.03 |
| 5,544,347 A | | 8/1996 | Yanai et al. | ................ 395/489 |

(List continued on next page.)

FOREIGN PATENT DOCUMENTS

EP          0 537 903 A2    4/1993    ........... G06F/15/16

OTHER PUBLICATIONS

EMC GeoSpan for MSCS: Disaster–Tolerant Clusters, EMC, Version 1.2 Rev. 3.*
EMC Data Manager (EDM): Enterprise Information Backup/Recovery System, EMC, 2001.*
Symmetrix Remote Data Facility (SRDF), EMC, 2002.*
No Data Loss Standby Database, EMC, Feb. 2001.*
Australian Patent Office Search Report for Singapore Application No. SG 200002471–1, dated Nov. 12, 2001 (mailing date).
Australian Patent Office Examination Report for Singapore Application No. SG 200002741–1, dated Nov. 12, 2001 (mailing date).
Fisher, Sharon, "Tandem Intros Fault–Finding Servers & App," *Communicationsnetweek*, 1194, n. 526, p. 27, Oct. 10, 1994.
Garvey, Martin J., "EMC Enhances Data Replication and Storage Products—Expands Reach By Adding Ip Support to Software, Fibre Channel Interconnectivity to Systems," *Informationweek*, 2000, n. 772, p. 32, Feb. 7, 2000.

(List continued on next page.)

*Primary Examiner*—Robert Beausoliel
*Assistant Examiner*—Gabriel Chu
(74) *Attorney, Agent, or Firm*—George T. Marcou; Kilpatrick Stockton LLP (57) ABSTRACT

A system and method to allow mirroring of data into a recovery site in real time so that as data is written to disk in a primary data center location, it is concurrently copied to disk at a recovery site, thereby eliminating the use of separate magnetic media for that purpose. Real-time mirroring of data is provided to a separate facility which is connected to a first mainframe data center through appropriate communications circuits. The secondary data center operations are kept current with the primary data center's operations so that in the event of a system failure, operations of the data center can be recovered in an expedited manner.

45 Claims, 5 Drawing Sheets

U.S. PATENT DOCUMENTS

| | | | | |
|---|---|---|---|---|
| 5,592,618 | A | | 1/1997 | Micka et al. .......... 395/185.07 |
| 5,727,142 | A | | 3/1998 | Chen .......................... 395/181 |
| 5,734,818 | A | | 3/1998 | Kern et al. ............. 395/182.18 |
| 5,742,792 | A | | 4/1998 | Yanai et al. ................. 395/489 |
| 5,794,252 | A | * | 8/1998 | Bailey et al. ............... 707/202 |
| 5,852,715 | A | | 12/1998 | Raz et al. .............. 395/200.31 |
| 5,870,537 | A | * | 2/1999 | Bailey et al. .................. 714/6 |
| 5,928,367 | A | | 7/1999 | Nelson et al. ................. 714/6 |
| 5,966,730 | A | * | 10/1999 | Zulch ......................... 711/162 |
| 6,163,856 | A | * | 12/2000 | Dion et al. ..................... 714/4 |
| 6,446,175 | B1 | * | 9/2002 | West et al. ................. 711/162 |
| 2001/0050915 | A1 | * | 12/2001 | O'Hare et al. .............. 370/400 |

OTHER PUBLICATIONS

Hoffman, Thomas, "Testing Y2K on Mirror Site Saves for Exchange," *Computerworld*, v. 32, n. 38, pp. 45–47, Sep. 21, 1998.

Zerega, Blaise, NYCE Improves Disaster Recovery Plans, *InfoWorld*, v. 20, n. 20, p. 108, May 18, 1998.

Rodriguez, Tony, "Wide–Area Data Mirroring Protects Business Continuity," *Computer Technology Review Storage Inc. Supplement*, pp. 47–48, Winter, 1997.

Barney, Lee, "Being Prepared for the Unexpected Catastrophe," *Wall Street & Technology*, v. 13, n. 8, pp. 24–26, Aug., 1995.

Jacobson, Robert V., "A computer Security Self–Test," *Security Management*, v. 39. n 7, pp. 118–129, Jul., 1995.

"NSI Software Releases Double–Take 3.1 Server High Availability Software," *PR Newswire*, p. 8195, Jan. 24, 2000.

"Double–Take 3.0 Passes Microsoft BackOffice Logo Testing," *PR Newswire*, p. 0226, Jul. 13, 1999.

"Network Integrity Introduces Real–Time Replicator for NT," *Business Wire*, p. 8251246, Aug. 25, 1997.

"NSI Takes LAN Backup Off–Site; Double–Take Product Adopted by Leading Business Continuity Services," *Business Wire*, p. 05141120, May 14, 1997.

"Panorama Software Announces the First Truly Enterprise–Wide, Multi–Platform Business Continuity Solution," *PR Newswire*, p. 106LAM003, Jan. 6, 1997.

"RADWARE and NSI Software Team Up to Provide 24x 7 Web Server Uptime," *PR Newswire*, Mar. 13, 2000.

"NSI Software's Double–Take Wins Editor's Choice Award," *PR Newswire*, Jul. 17, 1998.

"NSI Software's Double–Take For Windows NT Earns BackOffice Logo," *Business Wire*, Mar. 24, 1998.

"Connected Corporation Wins Two Prestigious Industry Awards for Connected Online Backup," *PR Newswire*, p. 1110NEM020, Nov. 10, 1997.

"Storage: MCI Deploys News Fast Data Transfer Technology From EMC. Multimillion–Dollar Installation of Symmetrix Remote Data Facility (SRDF) Allows Real–Time Data Mirroring Over Extended Distances (EMC Corp.'s Extended Distance SRDF)," *Edge*, v. 10, n. 357, p. 5(1), May 29, 1995.

Sullivan, Kristina B., "New Solutions Improve Disaster Recovery (Electronic Vaulting and Server Mirroring Services and Programs)," *PC Week*, v. 12, n. 2 p. N1(3), Jan. 16, 1995.

"Comdisco and EMC Reduce Recovery Time," *Computer Fraud & Security Bulletin*, Aug. 1, 1996.

"BPR User Profiles: IT Managers Tackle Disaster Recovery," *Best Practices Report*, v. 1, n. 7, Mar. 1, 1995.

Wong, Ken, "Current Trends," *Computer Fraud & Security Bulletin*, Sep., 1990.

"How a 1,000 Bed University Medical Center Would Handle a Disaster," *National Report on Computers , & Health*v. 10, n. 1 Jan. 9, 1989.

* cited by examiner

METHOD AND SYSTEM FOR RECOVERING DATA TO MAINTAIN BUSINESS CONTINUITY

CROSS REFERENCE TO RELATED APPLICATIONS

This application is related to provisional application Ser. No. 60/131,565 which was filed Apr. 29, 1999, and claims priority to the filing date of that application. The disclosure of application Ser. No. 60/131,565 is specifically incorporated by reference herein.

BACKGROUND OF THE INVENTION

This invention relates to a method and system of implementing data recovery on a large scale. Typically by large scale is meant, for example, terabytes of data. More specifically, the invention relates to a method and system of implementing data recovery to facilitate uninterrupted continuation of business operations, and in particular, in a banking/financial transaction environment where millions of activities or transactions are conducted daily.

As the amount of data that is processed within a data center, for example, one used in banking/financial operations, has grown significantly over recent years, it has reached a point where traditional types of contingency data recovery processes are no longer viable. Specifically, such traditional processes currently take too long and place business operations at risk of being interrupted for unacceptable periods of time.

Current data centers process financial transactions from global customers communities. Such financial transactions include such things as fund transfers in the amounts of billions of dollars per day. Traditional recovery processes within such data centers provide for weekend copying of critical data in the environment to a magnetic tape, and the storage of the magnetic tapes at an off-site facility. In the event of disasters, the tapes located at the alternate site are shipped to a recovery center and the data is copied from the magnetic tape onto disk drives. Subsequent to that, the system is then restarted from that point in time of the weekend. The baseline of data that was restored to the weekend, is then updated with incremental backups throughout the course of the week, which are also stored off-site to bring current the data at the recovery site.

The types of disasters which require this type of backup operation are those that cause the mainframe data center not to function. Examples of such disasters include fire, major electrical failure or other like causes. Specifically, a "disaster event" is an event that renders the main computer center unusable and causes implementation of contingency plans as described previously.

Under current conditions, the traditional recovery processes are inadequate because of the amount of time it takes in transit for the tapes to arrive at the off-site facility, as well the time required for restoration or copying of tape data from magnetic tape onto disk. The process currently can take up to 48 hours, and by the time the business applications are run and resynchronized with each other, total elapsed time can be 2 or 3 days.

Accordingly, in accordance with the invention, the problems with current data recovery are avoided and a much more efficient and expeditious system and method of providing such recovery is provided, avoiding the disadvantages of the prior art.

SUMMARY OF THE INVENTION

In accordance with the invention, a system and method are provided which allow mirroring data into a recovery site in real time, for example, during daytime operation, so that as data is written to disk in the primary data center location, it is concurrently copied to disk at the recovery site, thereby eliminating the use of separate magnetic media for that purpose.

More specifically, real time mirroring of data is provided to a separate facility which is connected to the mainframe data center through appropriate communication circuits for example, through T3 circuits. Specifically, the primary data center is upgraded with appropriate hardware, firmware and software, and a communications infrastructure is built between the primary data center location and a backup site, with sufficient hardware installed at the recovery site and through software, the operations of the primary data center to keep the remote data center disk current with the primary data center's data are controlled. In order to implement the system, existing disk storage technology, for example, available from EMC Corporation is deployed. Disk subsystem(s) reside at the primary site and at the remote backup site, and existing software available from EMC under the name Symmetrix® Remote Data Facility (SRDF) provides the mirroring capability.

The system as implemented allows recovery during the "on-line" business day as well as allowing for "batch", typically night-time recovery.

More specifically, in one aspect the invention is directed to a method of recovering system function and data in the event of failure of on-line systems connected to a data center. A first data center having a predetermined equipment configuration is first established. A second data center having an equipment configuration which is substantially equivalent to the equipment configuration at the first data center is also established. In operation, critical on-line data is written in real time to a disk store at the first data center and to a mirror disk store at the second data center. In this regard, it is important to appreciate that it is critical on-line functions and data which is first recovered after a failure. By the term "critical" is meant the data required to enable the business unit or units to continue their mission critical computer based processing. Examples of critical on-line functions to be recovered during an on-line day include, in the event of a banking operation, account balance inquiry, enabling of transmission interfaces, primarily with customers, application support staff, data center applications, customer support and other necessary recovery steps required before making the system available to other users. Thereafter, restoration and recovery of data needed for nightly batch processing and restoration of other non-critical applications will then take place once the most critical functions are recovered, via traditional manner.

For daytime operation of the first data center, critical batch processes are also backed up by storing batch data and processes on a mirror disk at the second data center. For nighttime operations, critical batch processes are backed up by a combination of disk mirroring and by creating magnetic tape files within a tape silo at the second data center. Upon system failure, the equipment at the second data center is prepared and configured for operation. The state of the system at the time of failure is determined with a scheduling subsystem on the equipment at the second data center using mirrored scheduling data.

In another aspect, the invention is directed to a system for recovering systems functions and data in the event of failure of on-line systems connected to a data center. A first data center is established having a predetermined equipment configuration, and a second data center is also established having an equipment configuration which is substantially equivalent to the equipment configuration at the first data center. A first connection is provided between the two data centers for writing critical on-line data in real time to a disk store at the first data center and to a mirror disk store at the second data center. A second connection serves to back up critical batch processes during daytime operation of the first data center by storing batch data and processes on a mirror disk at the second data center. A third connection is configured for backing up critical batch processes during nighttime operation of the first data center by creating magnetic tape files critical for nightly batch recovery from disk files at the first data center onto a tape silo at the second data center. The second data center is further programmed for determining the state of the system at the time of a failure, with a scheduling subsystem mirrored to run on the equipment at the second data center, for determining which systems need to be restarted.

BRIEF DESCRIPTION OF THE DRAWINGS

Having thus briefly described the invention, the same will become better understood from the following detailed discussion, made with reference to the attached drawings wherein.

DETAILED DISCUSSION OF THE INVENTION

In accordance with one aspect of the invention, batch recovery can be accomplished through a combination of a remote disk mirroring system, complemented by a remote tape vaulting process. A tape silo(s), typically available from Storage Technology Inc., is installed in the remote data center and connected through a network infrastructure to the primary data center. A determination is made as to which magnetic tape files are critical for nightly batch recovery, and instead of creating them locally within the primary data center, are directed for creation within the remote silo at the recovery location. This determination is made by way of a software reporting system known as CD/IBR (Critical Dataset/Identification, Backup and Recovery), commercially available from Implementation and Conversion Services, Inc. The software can be locally customized in a routine manner depending on parameters selected to be important for identifying critical files to be recovered. Thus, through real time disk mirroring at night, combined with the tape files that reside in the remote silo, recovery can be quickly achieved should a disaster occur at the primary data center during the nightly batch process.

The remote mirroring is implemented on a disk volume basis. For example, all data on a designated disk is mirrored. A determination is made at the primary site as to which volumes or subsystems are critical for recovery at the remote site. Once the identification is made, the mirroring process is appropriately configured. Specifically, each of the required volumes is identified to the remote data facility, and the remote mirroring capability is activated against that particular volume or volumes.

Turning now to the on-line portion, i.e., the daytime portion of the recovery, should a disaster occur during the processing of on-line transactions, they occur, for example, within a system known as a CICS (Customer Information Control System) system (conventional and well known to those of ordinary skill in the art) which is used to control on-line applications. Examples of other types of systems in which this occurs are DB2™, IDMS (Interactive Distributed Multimedia Systems and Telecommunications Services), or other on-line database or transaction monitors. The recovery strategy as implemented herein allows for recovery to the point in time of the failure. The daytime recovery does not rely on any magnetic tape media in the remote silo. The system as implemented is fully recoverable from remote mirrored disks and in that manner can be recovered very quickly and substantially to the point in time of the failure. More particularly, in essence, recording is achieved at both locations substantially simultaneously as data comes in as a result of semi-synchronous mirroring, and thereby provides for point in time recovery of on-line data. This includes transmitting customer and internal data to both the primary and secondary data site. In the event of failure, this eliminates the need for any data retransmission.

In order to recover the failed system, an equipment configuration is provided at the recovery site that is essentially equivalent to the equipment configuration at the primary site, and when a disaster occurs, the recovery plan at the recovery site is initiated. This can be achieved by a phone call to the provider of the service at the remote recovery site which then triggers a series of events.

More particularly, the first step is that the equipment configuration at the recovery site will be prepared immediately for operation and configured according to prearranged specifications. The system is then made available to begin the start of processes which allows initializing of the system software, and start up of the operating system, for example, an MVS (Multiple Virtual Storage) mainframe operating system software environment. Other environments in which the invention can be deployed include a variety of midrange platforms such as UNIX/AIX (Advanced Interactive eXecutive), VAX/VMS (Virtual Address eXtension/Virtual Memory System), etc. An automated scheduling subsystem is started and used to determine exactly the state of the system at the time of the failure, and will allow the operations staff to determine and know which systems need to be recovered. After that investigation is conducted, the systems that were operating at the time of the failure are then restarted.

One aspect of the system is a device known as a link utilization monitor which is integrated into the software and hardware deployed. More particularly, this monitor facilitates maintaining system performance at the primary site and provides sufficient communications bandwidth between the sites so that the process at the primary site is not degraded in any manner while remote mirroring is operational. A key to providing sufficient bandwidth between sites is the ability to be able to determine how much available bandwidth is currently used, especially during peak periods, so that adequate capacity can be provided, thereby avoiding performance or response degradation at the primary site. Thus, the link utilization monitor provides that function and information to make the infrastructure manageable.

A weakness in disk mirroring technology has been its inability to maintain logical data integrity across disk subsystems. In accordance with the invention, this risk is mitigated by implementing software which allows identification of potential data integrity exposures and for taking corrective action. An example of such a condition is that if a database were to reside on a subsystem, and a recovery journal for the database were located on a second subsystem, if a failure were to occur during the active operation of the database, recovery of the application at the remote site is potentially problematic depending on the exact timing and synchronization levels between the journal and the actual database. In accordance with the invention, software is implemented that recognizes various logical data entities and reports on the data entities. In this example, the software will report that the journal for the particular database has migrated onto a subsystem and represents a potential recovery or integrity exposure. After an alert is issued, corrective action is then taken. More particularly, the software automatically detects failures in the mirroring infrastructure, issues an automatic alert or warning to support personnel and a manual correction is implemented.

Another aspect of the system is the ability to test at the remote site for the adequacy and effectiveness of the mirroring process simultaneous with the mirroring process itself.

Such testing is achieved by physically and logically separating a copy of disk data at the remote site. In accordance with the invention, the system provides for four literal copies of all data, i.e., two copies at the primary site, for disk recovery purposes, should there be a local disk failure, and two copies of the mirrored data at the remote site.

The function is achieved by logically separating and physically separating the fourth copy at the remote site and treating it as a separate logical system and database using that copy for recovery testing, while the other copy at the remote site is still active in mirroring all data transactions at the primary data center. In effect, the individual mirrored disks can be automatically decoupled under program control. The decoupled mirrored disk can be used to validate the integrity of the mirrored data and the remote or alternate data center configuration. Subsequent to continuity testing at the recovery site, the fourth copy is then refreshed from the third copy or the other copy at the remote site, and synchronized so that both versions continue to be synchronized from that moment on until the next time that it is broken away for a continuity test, i.e., the decoupled disk is automatically recoupled across the entire disk configuration under program control.

Thus, as may be appreciated, in accordance with the invention as implemented, recovery time of applications is reduced from, in some cases several days, to two and half hours. In a more specific aspect, this is achieved by implementing disk caching of tape data. This aspect is implemented in a case of the nightly batch recovery into a remote silo. Also, certain critical batch data is staged onto a mirrored disk to the recovery site. It has a relatively short life span on the disk and is downloaded off the disk onto a local tape at the primary data center.

To achieve the most efficient and reliable mirroring, the communication linkages implemented are very robust, and implement the latest SONET (Synchronous Optical NETwork) Ring technology currently available from communications providers to provide alternate routing in the case of the loss of any one of the network links.

With respect to the specific details of the software available from various vendors, in particular EMC Corporation, software such as EMC Corporation's SDRF (Symmetrix Remote Data Facility) serves to provide the mirroring capability in accordance with the invention. All of the commonly used SRDF commands have been automated to simplify their use and reduce the potential for error. Specific commands which have been automated include "SRDF QUERY," "SRDF COPY," "SRDF SEMISYNC," "SRDF RESUME," "SRDF SUSPEND/SRDF SUSPEND,COB," and "TSO WHERE." The commands themselves are described later herein. In addition, the purpose of the commands, where they reside, any special considerations which may apply, and a sample of the native SRDF command involved by the automation routine is described herein.

Although the invention is described with reference to EMC's SRDF, it will be readily apparent to those of ordinary skill in the art that alternative systems may be substituted. For example, in place of EMC's SRDF, a system such as that available from Hitachi "Data Systems" Hitachi Remote Copy (HRC) and Hitachi Open Remote Copy (HORC) disk mirroring technology can be deployed in place of the EMC systems as will be readily apparent to those of ordinary skill in the art. Similarly IBM Corporation can provide such a system.

Turning now to the attached drawings, the Figures will now be discussed in a manner to provide a general sense of the configuration of the system 11 and method of operation. A more detailed discussion will follow thereafter.

Figure 1:
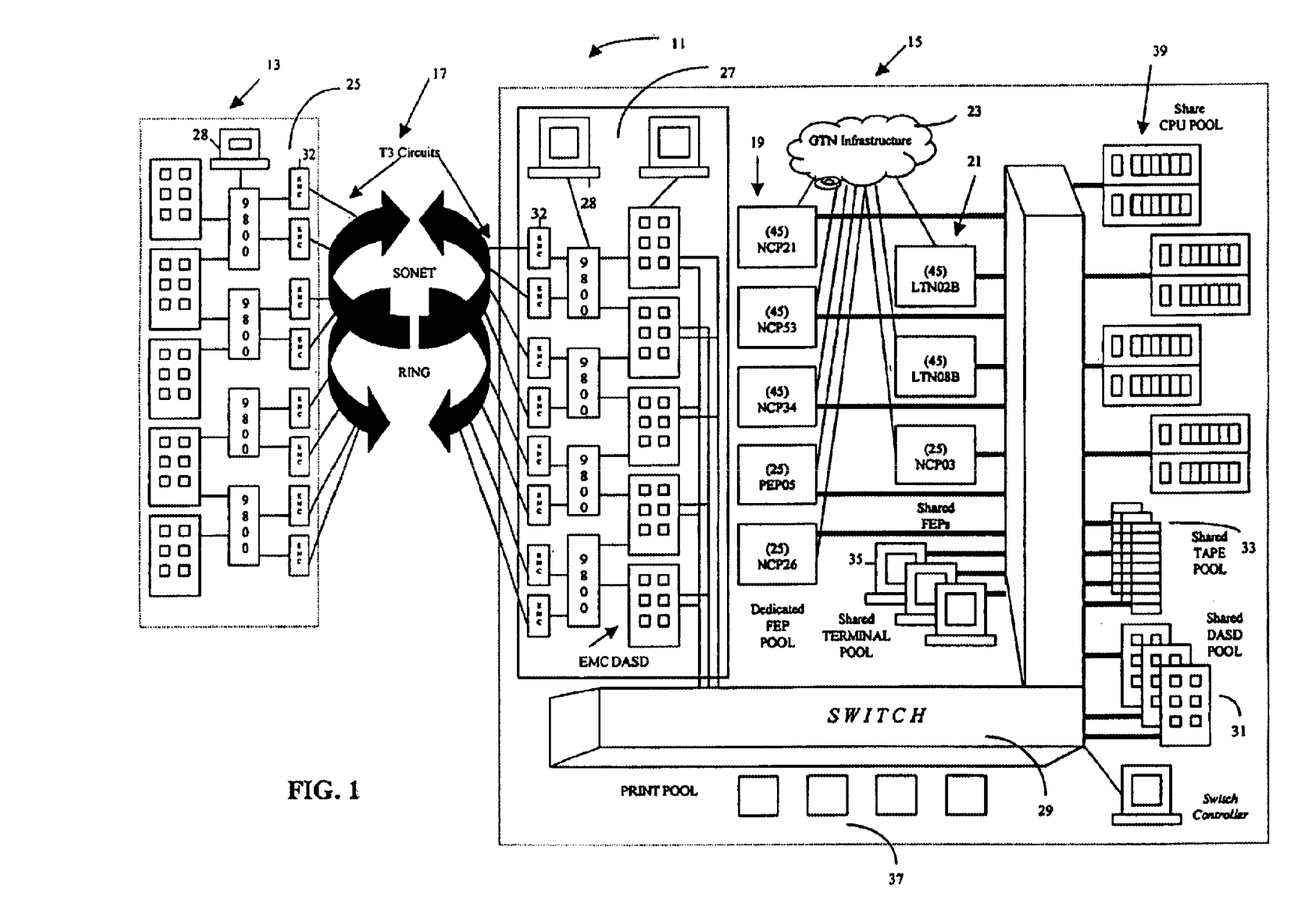
FIG. 1 is a schematic diagram illustrating one embodiment of the system topology to provide remote mirroring at a secondary data center connected to a primary data center.
Figure 2:
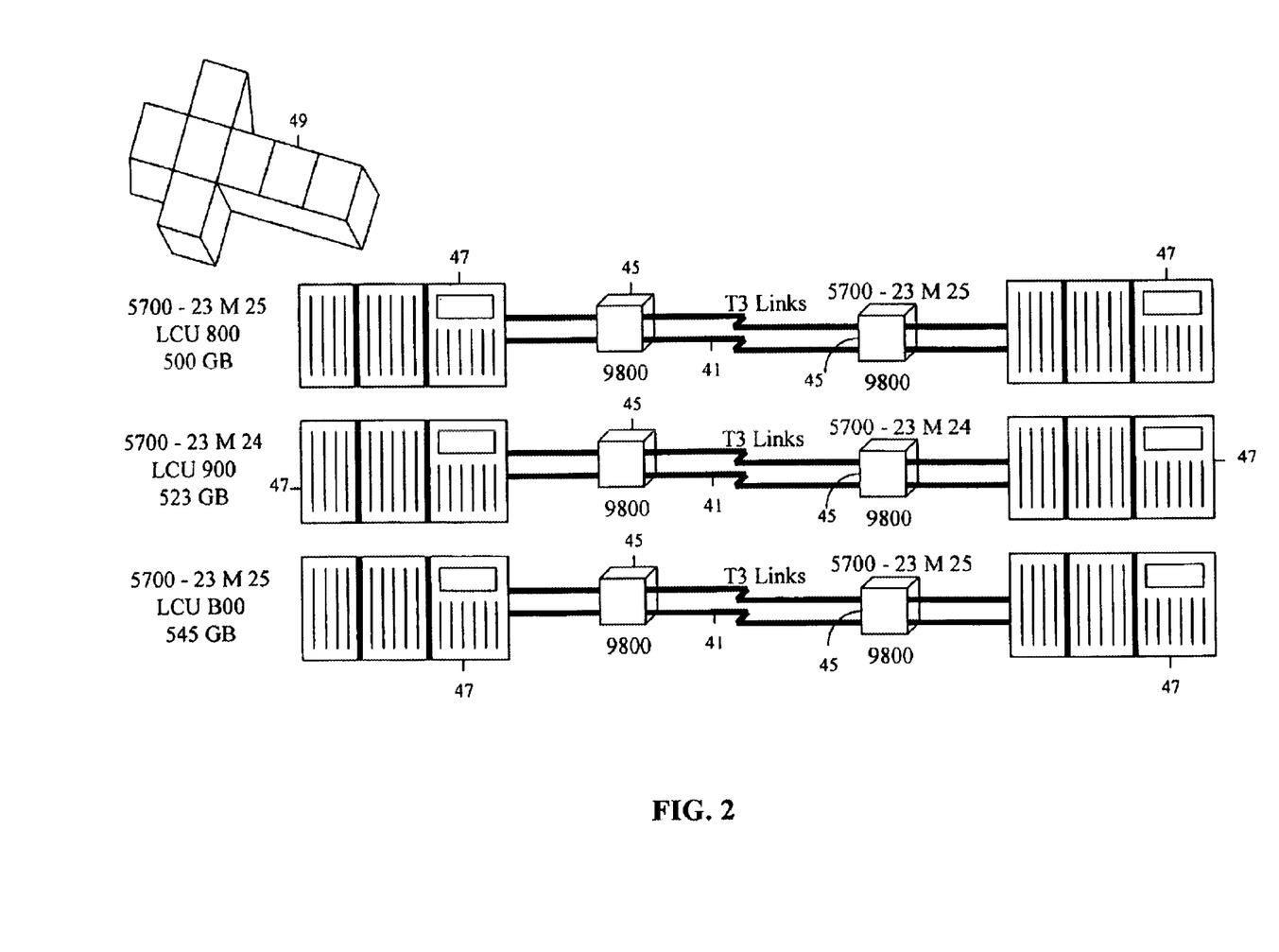
FIG. 2 is a general configuration overview of the storage network system used in the system herein.

As illustrated in greater detail in FIG. 1, a SONET Ring 17 is installed between a primary data center 13 a secondary data center 15. Twelve T3 circuits are deployed, of which six are allocated for disk mirroring, and five are allocated for remote tape vaulting. The remaining T3 circuit is deployed across the vaulting infrastructure based upon capacity requirements. In this regard, FIG. 2 illustrates in greater detail the specific T3 links 41 between the primary data center 13 and the secondary data center 15. Of special significance is the fact that, for example, the T3 circuits are security protected by data encryption technology, thereby providing a secure public communications facility. This is shown in FIG. 1 with encryptors 32 connected within the system.

Figure 4:
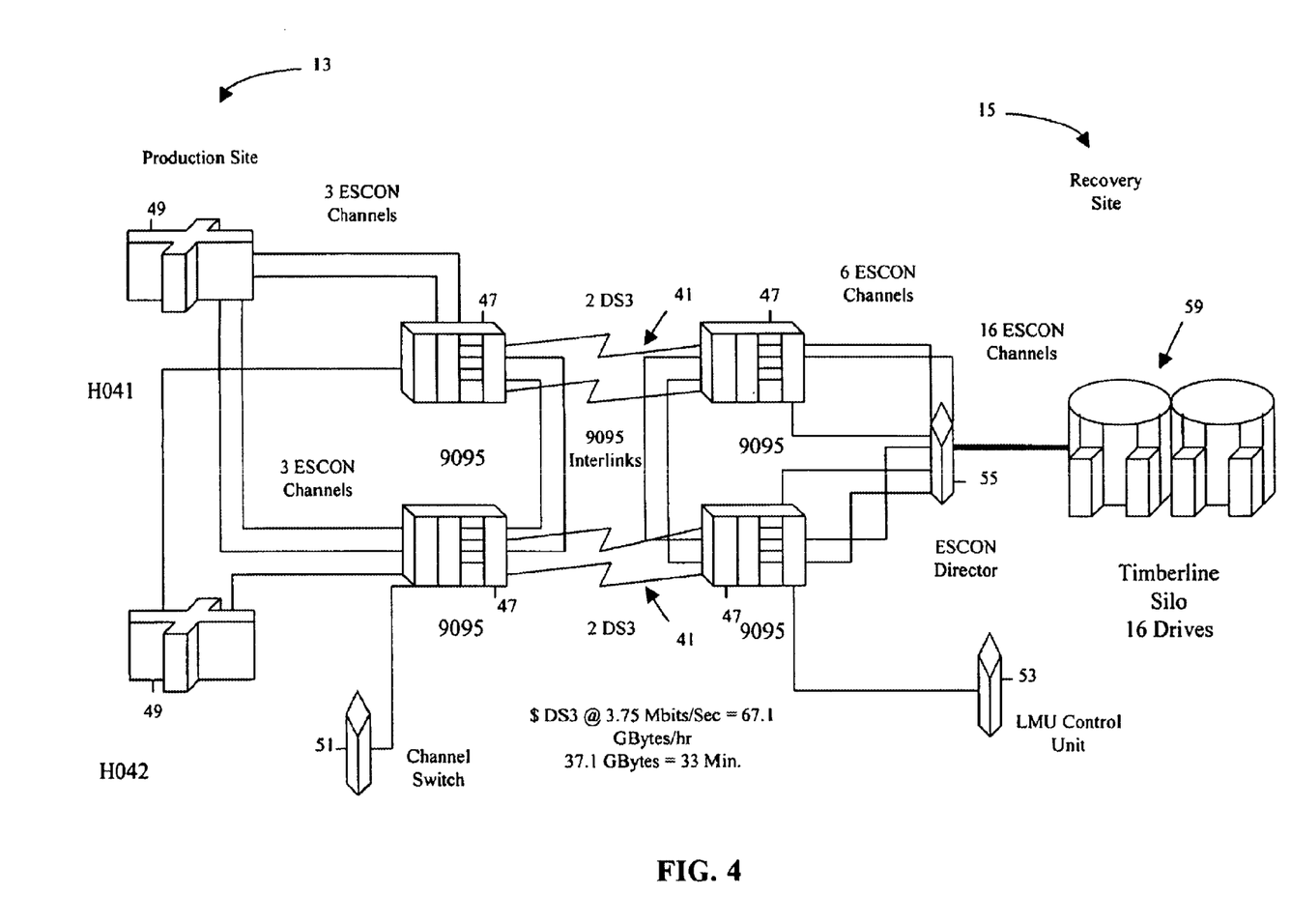
FIG. 4 is a general schematic diagram illustrating connections between a first data center and a second data center for the tape vaulting of batch oriented data into a remote tape silo.
Figure 5:
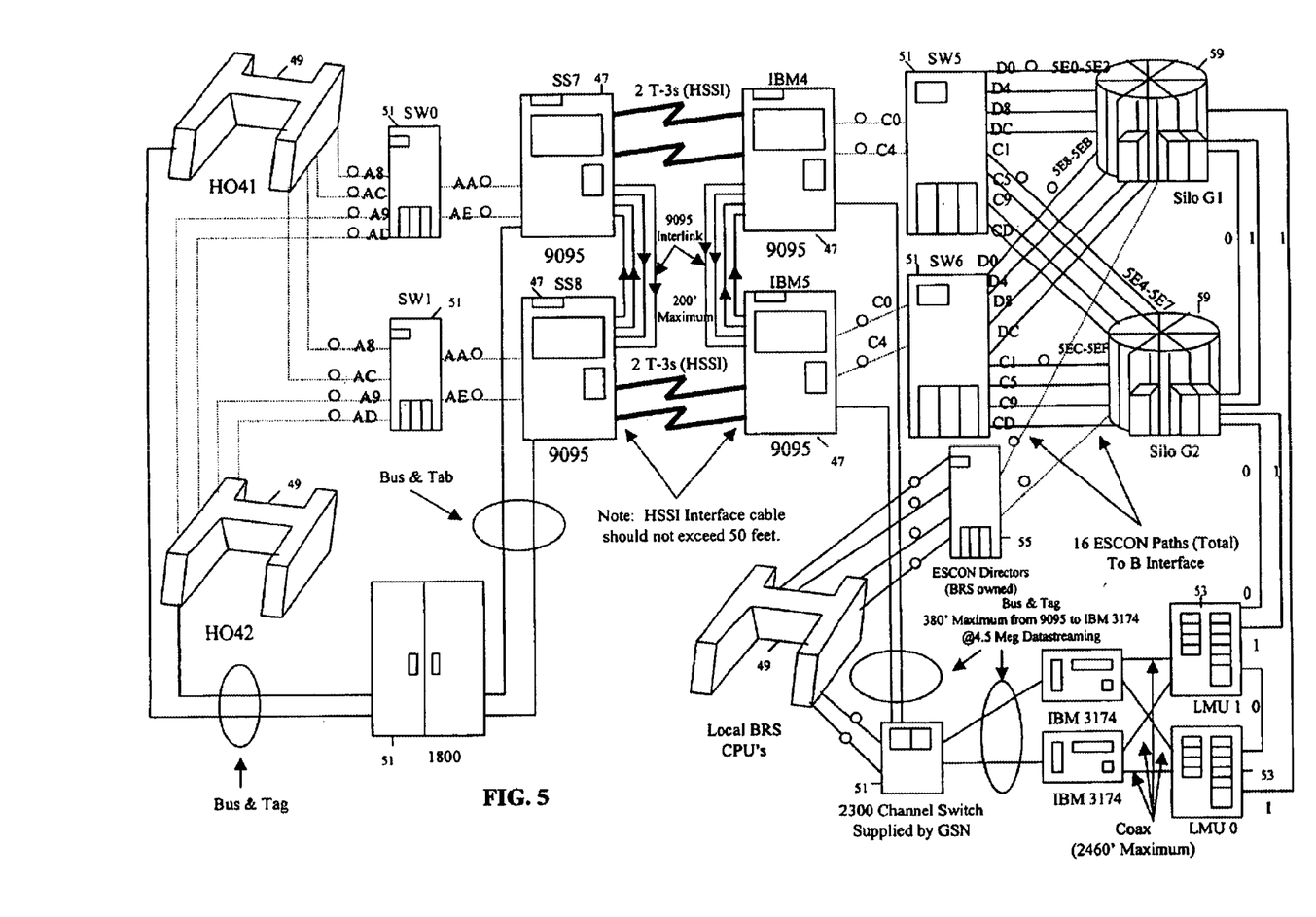
FIG. 5 is a more detailed illustration of the networking system configuration of FIG. 4 for providing tape vaulting in connection with the method and system described herein.

FIGS. 4 and 5 illustrate remote silo configurations. The silo configuration is based on the number, size and frequency of back-ups necessary to accomplish intraday and nightly batch recovery. With these backups off-site, i.e., at the recovery data center, batch recovery can be accomplished exactly as it would if there was a local primary data center failure, i.e., a CPU (Central Processing Unit) failure in midstream.

The files for local recovery will normally exist for a short period of time and will not be used as input to a scheduled production process.

In addition, while the system provides mirroring from a primary site to a remote site in the event of catastrophic failure, it also provides for re-establishing operations at the primary site once the failure(s) is corrected. Once the problem is resolved, reverse mirroring the secondary site to a primary site is achieved in the same manner that mirroring from the primary site to the secondary site can be achieved. Thus, the primary site becomes the mirroring remote site and the remote site operates as the primary site.

In addition to the specific aspects of the invention as disclosed herein, additional features and details of the invention are discussed hereafter.

Turning again now to FIG. 1, the system 11 of the invention is shown as having a primary data center 13 connected through means of SONET Ring technology 17 employing T3 circuits to a secondary data center 15.

The direct access storage devices or drive used in the system are shown in the system as disk storage configurations, typically direct access storage device (DASD) arrays 25 and 27 at the respective data centers 13 and 15, and each having multiple disks as part of the array. These devices may be typically interconnected through the SONET Ring 17 employing the T3 circuits and are interconnected through the use of storage networking systems more generally shown as elements 45 in FIG. 3 interconnected by the T3 links 41 to connect to the DASD systems 47. Other types of interconnections can be accomplished through use of lease lines of varying speeds, T1 facilities, native T3 circuits, ATM (Asynchronous Transfer Mode) connections and others. A monitoring device 28, known as a link utilization monitor (LUM), particularly at the primary site, monitors network utilization, i.e., T3, to determine the available capacity of the connection between the primary and secondary data centers. This is done by periodic sampling of the utilization under programmed control, and displaying information about the line utilization. Typically the storage networking system is one which was previously available as the 9800 SNS (Storage Network System) from General Signal Corporation, now having been acquired by SPX Corporation and available from its subsidiary Inrange Technologies Corporation on a updated basis, still employing the 9800 series designation, as the 9801 SNS. The systems 45 are networking systems for business continuance and disaster recovery and provide performance storage networking at low bandwidth cost. They operate with the DASD, typically available from EMC Corporation, and implemented using disk mirroring software such as the disk mirroring software available from EMC Corporation known as SRDF, or alternatively, such as that previously discussed as available from Hitachi Data System, IBM or others, to extend the specific storage devices, or in connection with any ESCON (Enterprise Systems Connection) device.

Figure 3:
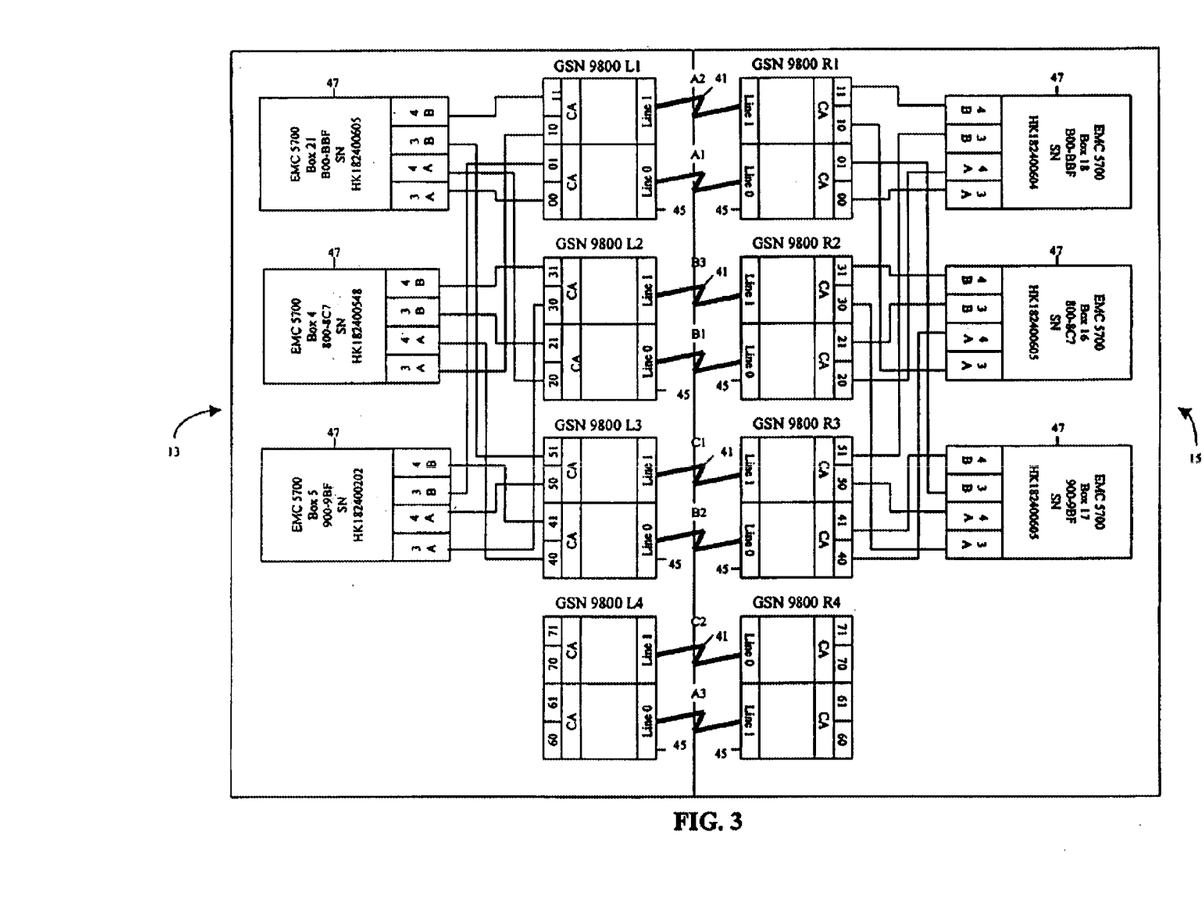
FIG. 3 is a more detailed illustration of the networking system connection, including storage devices connected together between a first data processing center and a second data center.

Thus, communications between the two data centers 13 and 15 is enabled by means of the storage network system connections shown in greater detail in FIG. 3 with respect to the various interconnections between the networking systems 45 and the DASD devices 47 of the arrays 25 and 27.

As further shown in FIG. 2, the typical configuration for mirroring involves three of the DASD units 47 at each site such that the subsystems are physically housed in a secured space within each of the data center environments, and the respective units 47 are connected by three pairs of T3 lines with channel extenders and encryptors. Thus, for example, the SRDF software running at the respective site, enables mirroring at the volume level of selected volumes, the number of volumes being mirrored initially are typically about 600 volumes (approximately two (2) terabytes of data), which requires recovery on a large scale. Normal mirroring is conducted in a semi-synchronous mode, meaning that the data on the mirrored volumes will at most be one write behind at any time, and recovery can be accomplished to the point in time of a failure with no loss of data. The rest of this discussion will refer only to the secondary data center 15, it being understood that the first data center 13 and second data center 15 are substantially the same with respect to equipment and software configurations. The DASD array 27 is connected to a dedicated ESCON switch within a switch 29. In like manner, the switch 29 connects to dedicated front end processors 19. The dedicated front end processors 19 are connected by T1 lines to the customer network and infrastructure 23. It may be appreciated that, also connected to the matrix switch 29 is a print pool 37, a shared terminal pool 35, a shared DASD pool 31, a switch controller (not numbered), a shared tape pool 33, and a shared CPU pool 39, as well as a shared front end processor pool 21.

FIG. 4 shows in greater detail a remote tape management system to allow vault tape backups. As may be appreciated the silo at the recovery site 15 is connected to the primary site 13 via five T3 lines 41. Data flow is from a central processing unit 49 through ESCON channels to DASD devices 47 of array 25 through the T3 lines 41 to the DASD devices 47 of array 27 at the recovery site 15 and to a tape silo 59 which includes 16 tape units in two silos and is configured for redundancy. In the event of severance of the T3 connections to the remote silos 59, backups are directed to local tape units in the primary data center 13 and propagated to the remote silos 59 once the connections are restored. The flow of data is controlled by a channel switch 51 at the primary data center 13 and controlled at the secondary or recovery site 15 through a library management unit (LMU) control unit 53, which provides commands to a robot inside the tape/silo in a conventional manner, and through an ESCON director unit 55.

A more detailed configuration for conducting tape vault operations is further shown in FIG. 5 wherein the various elements are also shown numbered, and the interconnections and the operation thereof will be readily apparent to those of ordinary skill in the art and similar to that of FIG. 4.

The invention is implemented in the environment of global banking in which many financial services generate transaction flow to and from, in this case, a banking data center, to initiate transactions on behalf of the bank's clients and/or internal users. Services provided over such a network from a data processing center include such services as security trading, both within the bank implementing the data processing center, as well as outside of the individual bank's system. In addition to on-line transactions, checking systems receive and generate batch feeds from and to operating units within and outside the bank's environment.

Another function implemented through the network includes fund transfers which are initiated by customers and posted in real time. Thus, it becomes important to be able to recover these functions, many of which are considered critical on an expedited basis.

As previously explained, critical systems and functions are those which are initially recovered prior to recovering other functions and data in the event of system failure. Examples of functions which are considered critical include checking, such as corporate checking and financial institutions checking. Other functions considered important are DB2-based applications that provide same-date posting to account balances, and supporting interaccount aggregation. Further, electronic banking to corporate customers, check processing control systems for various regions, applications that process remittances, support lock box operations, applications that support multi-currency transactions, and such other systems as billing applications, electronic check managers and global check systems are all considered critical and are the first to be recovered in the event of a failure.

The following timeline provides an example of the typical recovery window for the system and method in accordance with the invention.

The target recovery window for critical systems are measured from the time of declaration of a disaster. They are as follows:

Critical on-line systems—2.5 hours to restore critical functions and data;

Critical batch systems—2.5 hours to restore the environment and resume the batch at the appropriate recovery point (prior to the outage).

In accordance with the method, recovery is accomplished by switching the front-end network, readying and IPLing (Initial Program Load) the system, establishing the connections to key user locations, activating critical applications and support systems (for example, TSO (Time Share Operation), scheduling subsystems, security subsystems, CICS regions, etc.), allowing application support staff and operations to conduct initial investigation of application and transactions status.

Although a discussion of a number of critical on-line functions has been provided, the most critical on-line functions to be recovered during the on-line day are checking account balance inquiry and fund transfer network interfaces. The enabling of the transmission interfaces, primarily with customers, will follow after the most critical functions have been restored. In a recovery situation, critical on-line CICS regions are started. Application support staff, application managers, and customer support personnel will operate the data center to conduct investigations, verify the status of the files and transactions, and take necessary recovery steps before making the system available to other users. Restoration and recovery of data needed for checking nightly batch processing and restoration of other applications will also take place once the most critical functions are recovered.

The back up of system and application files critical to recovery during the on-line day utilizes "volume" based disk mirroring. Critical data is written in substantially real-time, i.e., in semi-synchronous mode, to corresponding target disk volumes at the back-up site and will be made available in the recovery process. Further, local mirror disks are provided at the remote site. In this manner, the failure of one or more disks at the remote site does not affect the recovery process due to provisioning of the local mirrors. The back up of critical batch processes during the day is implemented using a combination of disk mirroring and remote tape back up, depending on the characteristics of the process (i.e., files exceeding a given size are written to the remote silo as opposed to mirrored disk).

With respect to a disaster which strikes during nightly batch cycle, it is important to provide the ability to recover at the secondary data center. This is done by reverting to the current job or jobstream restoration point, and continuing the batch process. This requires that all files, i.e., on-line or back ups, needed to accomplish this objective, either reside on remotely mirrored disks, such as DASD at mirror array 27, or at shared DASD pool 31 or in the remote tape silo 59. The application recovery activities take place after the IPL of the system. Critical to this activity is taking a snapshot of the queue status at the time of outage. The status of jobs is recorded in the queues at the time of system failure and will be made available immediately as reports to appropriate personnel. The personnel in the data centers 13 and/or 15 will then execute the appropriate recovery steps for the applications, as is done today for a local failure. Specifically, batch recovery at the remote site will occur in the same manner as would be currently done at the primary location.

It is recognized that many intraday batch jobs are transmission related. These transmissions are either customer related or are intrabank and typically involve a growing volume in excess of 5000 transmissions per day. In accordance with the method and system of the invention, all incoming transmissions are mirrored and available for recovery in a contingency. The outgoing transmission pool will also be mirrored and available for retransmission.

In implementing the system and method of the invention, it is noted that all of the commonly used SRDF commands have been automated to simplify their use and reduce the potential for error. The sections below describe the commands which have been automated, their purpose, where they reside, any special considerations which may apply, and a sample of the native SRDF command invoked by the automation routine.

SRDF MVS Console Automation Processes

Command: SRDF QUERY
Function: A global command that queries the mode of all Symmetrix®, i.e., DASD boxes that participate in SRDF mirroring and returns mirroring mode volume counts and invalid track counts.
Libraries/Datasets: AFODLPLX.CMDLIB (SRDFQWRY)—exec—
AFODLPLX.CMDLIB(BOTH03)—rule trap—
Special Considerations: None
Manual command: ??SC VOL,addr,ALL
*note: addr=the starting unit address of the Symmetrixe® box Command: SRDF ADCOPY
Function: A global command that places the mode of all Symmetrix® boxes that participate in SRDF mirroring into adaptive copy disk mode.
Libraries/Datasets: AFODLPLX.CMDLIB (SRDFACPY)—exec—
AFODLPLX.CMDLIB(BOTH03)—rule trap—
Special Considerations: None
Manual command: ??SC VOL,addr,ADCOPY-DISK, ALL
*note: addr=the starting unit address of the Symmetrixe® box Command: SRDF SEMISYNC Function: A global command that places the mode of all Symmetrix® boxes that participate in SRDF mirroring into semi-synchronous mode. This command investigates that there are less than 100,000 invalid tracks per Symmetrix® before switching to semi-synchronous mode.

Libraries/Datasets: AFODLPLX.CMDLIB (SRDFSEMI)—exec—
AFODLPLX.CMDLIB(BOTH03)—rule trap—

Special Considerations: None

Manual command: ??SC VOL,addr,NADCOPY,ALL

*note: addr=the starting unit address of the Symmetrix® box

Command: SRDF RESUME

Function: A global command that resumes the mirroring process of all Symmetrix® boxes that participate in SRDF mirroring. The resume command automatically resumes the mirroring in adaptive copy mode only. The operator must use the SRDF QUERY command to determine when synchronization between the source and target Symmetrix® boxes is less than 100,000 invalid tracks per Symmetrix® box. Once under 100,000 invalid tracks on each Symmetrix®, it is safe to switch to semi-synchronous mirroring using the SRDF SEMISYNC console command.

Libraries/Datasets: AFODLPLX.CMDLIB (SRDFRSUM)—exec—
AFODLPLX.CMDLIB(BOTH03)—rule trap—

Special Considerations: The SRDF RESUME command is used to restart the mirroring process after a SRDF SUSPEND command was issued to stop the mirroring. If a refresh/refresh-resume process is done from the target side then the operator does not issue the SRDF RESUME console command!!

Manual command: ??SC VOL,addr,RDF-RSUM,ALL

*note: addr=the starting unit address of the Symmetrix® box

Command: SRDF SUSPEND/SRDF SUSPEND,COB

Function: A global command that queries the invalid tracks of all Symmetrix® boxes that participate in SRDF mirroring and suspends mirroring when there are zero invalid tracks. This allows for the most graceful suspension of mirroring.

Libraries/Datasets: AFODLPLX.CMDLIB (SRDFSUSP)—exec—
AFODLPLX.CMDLIB(BOTH03)—rule trap—

Special Considerations: None

Manual command: ??SC VOL,addr,RDF-SUSP,ALL

Manual command: ??SC LINK,addr,OFFLINE

*note: addr=the starting unit address of the Symmetrix® box

Command: SRDF SUSPEND,BREAK

Function: A global command that immediately suspends mirroring to all Symmetrix® boxes that participate in SRDF mirroring. Primary use of this command would be in a critical situation where the suspension of mirroring is needed as soon as possible without regard to target data integrity.

Libraries/Datasets: AFODLPLX.CMDLIB (SRDFBRAK)—exec—
AFODLPLX.CMDLIB(BOTH03)—rule trap—

Special Considerations: None

Manual command: ??SC VOL,addr,RDF-SUSP,ALL

*note: addr=the starting unit address of the Symmetrix® box

MVS HOST SELF LOCATOR

Command: TSO WHERE

Function: A TSO command that is executed from any command line, e.g., TSO command line, that determines which system the user is currently signed on. This command will differentiate cloned systems (Y2K, testbeds, etc.) vs. production systems by the examination of the CPU serial number.

Libraries/Datasets: SYS6.CLIST(WHERE)—exec—

Special Considerations: None

Manual command: LOGOFF system-visually determine location!

Having thus generally described the invention, the same will become better understood from the appended claims in which it is set forth in a non-limiting manner.

What is claimed is:

1. A method of recovering system function and data in the event of failure of on-line systems connected to a data center, comprising:

establishing a first data center having a predetermined equipment configuration;

establishing a second data center having an equipment configuration which is substantially equivalent to the equipment configuration at the first data center;

writing critical on-line data in real time to a disk store configuration at the first data center and to a mirror disk store configuration at the second data center;

backing up critical batch processes during daytime operation of the first data center by storing batch data and processes on the mirror disk store configuration at the second data center;

backing up critical batch processes during nighttime operation of the first data center by a combination of remote disk mirroring and by creating magnetic tape files critical for nightly batch recovery at a tape silo at the second data center;

upon system failure, preparing and configuring the equipment configuration at the second data center for operation; and determining the state of the system at the time of failure with a scheduling subsystem on said equipment at the second data center, to determine which on-line systems need to be restarted.

2. The method of claim 1 wherein said writing of critical on-line data in real time to the disk store at the first data center and the mirror disk store at the second data center is conducted in semi-synchronous mode and thereby provides for point in time recovery of critical on-line data.

3. The method of claim 1 wherein said writing of critical on-line data in real time to the disk store at the first data center and the mirror disk store at the second data center is conducted through volume based disk mirroring.

4. The method of claim 1 further comprising, determining the state of the system at the time of failure for a daytime failure, and once the state of the system at the time of failure is determined for a daytime failure, at the second data center, certifying the status of files and transactions for critical on-line functions, implementing necessary recovery steps for said files and functions, and once the recovery steps are complete, thereafter making the system available to users thereof.

5. The method of claim 4 further comprising, once critical functions and data are recovered, at the second data center, at nighttime, implementing nightly batch functions.

6. The method of claim 4 further comprising, once critical functions and data are recovered, at the second data center, restoring and recovering of other traditionally recovered applications and data.

7. The method of claim 1 further comprising, once the state of the system at the time of failure is determined for a nighttime failure, at the second data center, reverting to a then current job or jobstream restoration point and continuing batch processes from that point.

8. The method of claim 7 wherein said batch process is resumed with data on a tape silo at the second data center.

9. The method of claim 7 wherein said batch process is resumed with data on a mirror drive at the second data center.

10. The method of claim 1 further comprising, once the state of the system at the time of failure is determined for a nighttime failure, at the second data center, conducting an IPL of the system, determining the application queue status of applications at the time of failure, reporting the determined queue status, and executing recovery steps in accordance with the determined queue status.

11. The method of claim 1 wherein each disk store configuration includes multiple disks, and further comprising automatically decoupling individual mirrored disks of at least one of the mirror disk store configurations under programmed control.

12. The method of claim 11 further comprising validating the integrity of the mirrored data and the second data center configuration with the decoupled individual mirrored disks.

13. The method of claim 11 further comprising automatically recoupling decoupled individual mirrored disks across the entire mirror disk store configuration under programmed control.

14. The method of claim 1 wherein each disk store configuration includes multiple disks, and further comprising conducting backing up at the second data center on local mirror disks to avoid the failure of one or more disks at the second data center affecting the integrity of the method of recovering system function and data.

15. The method of claim 1 further comprising, once a failure is corrected at the first data center, reverse writing the critical on-line data and backing up batch processes from the second data center to the first data center.

16. The method of claim 1 further comprising monitoring the system for error messages indicative of errors in writing to and backing up on the mirror disk store configuration and magnetic tape files, and issuing an alert upon detection of any such error message.

17. The method of claim 1 wherein the first data center is connected to the second data center through a network, and further comprising monitoring utilization of the network to determine the available capacity of the connection between the first data center and the second data center.

18. The method of claim 17 wherein said network is a secured encrypted facility, and wherein the data is transmitted thereon.

19. The method of claim 1 further comprising conducting recovery of on-line data and function to the point in time of the failure with no loss of data.

20. The method of claim 1 further comprising conducting batch recovery at the second data center in the same manner as batch recovery is conducted at the first data center.

21. A method of recovering system function and data in the event of failure of on-line systems connected to a data center, comprising:

establishing a first data center having a predetermined equipment configuration;

establishing a second data center having an equipment configuration which is substantially equivalent to the equipment configuration at the first data center;

writing critical on-line data in real time to a disk store configuration at the first data center and to a mirror disk store configuration at the second data center;

backing up critical batch processes during daytime operation of the first data center by storing batch data and processes on the mirror disk store configuration at the second data center;

upon system failure, preparing and configuring the equipment configuration at the second data center for operation; and determining the state of the system at the time of failure with a scheduling subsystem on said equipment at the second data center, to determine which on-line systems need to be restarted.

22. A method of recovering system function and data in the event of failure of on-line systems connected to a data center, comprising:

establishing a first data center having a predetermined equipment configuration;

establishing a second data center having an equipment configuration which is substantially equivalent to the equipment configuration at the first data center;

backing up critical batch processes during nighttime operation of the first data center by a combination of remote disk mirroring and by creating magnetic tape files critical for nightly batch recovery at a tape silo at the second data center;

upon system failure, preparing and configuring the equipment configuration at the second data center for operation; and determining the state of the system at the time of failure with a scheduling subsystem on said equipment at the second data center, to determine what on-line systems need to be started.

23. A system for recovering system functions and data in the event of failure of on-line systems connected to a data center, comprising:

a first data center having a predetermined equipment configuration;

a second data center having an equipment configuration which is substantially equivalent to the equipment configuration at the first data center;

a first connection configured for writing critical on-line data in real time to a disk store configuration at the first data center and to a mirror disk store configuration at the second data center;

a second connection configured for backing up critical batch processes during daytime operation of the first data center by storing batch data and processes on the mirror disk store configuration at the second data center;

a third connection configured for backing up critical batch processes during nighttime operation of the first data center by a combination of remote disk mirroring and creating magnetic tape files critical for nightly batch recovery from disk files at the first data center, onto a tape silo at the second data center; and the second data center being further configured for determining the state of the system at the time of a failure, with a scheduling subsystem which is adapted to run on said equipment at the second data center for determining which on-line systems need to be restarted to provide for point in time recovery of critical on-line data.

24. The system of claim 23, wherein the first data center comprises a primary disk store and the second data center comprises a mirror disk store, and wherein the primary data center and secondary data center are programmed for writing critical on-line data to the primary disk store and to the mirror disk store.

25. The system of claim 23 wherein the first data center comprises a primary disk store and the second data center comprises a mirror disk store, and wherein the primary data center and secondary data center are programmed for writing critical on-line data in substantially real time to the primary disk store and to the mirror disk store through volume based disk mirroring.

26. The system of claim 23, wherein the second data center is programmed for determining the state of the system at the time of a daytime failure, for verifying the status of files and transactions for critical functions at the time of failure, for implementing necessary recovery steps for said files and functions, and once the recovery steps are complete, for making the system available for users thereof.

27. The system of claim 26, wherein the second data center is further programmed, at nighttime, for implementing nightly batch functions once critical daytime functions are recovered.

28. The system of claim 26, wherein the second data center is further programmed for traditional restoring and recovering of other non-critical applications and data once critical daytime functions and data are recovered.

29. The system of claim 23 wherein the second data center is programmed for determining the state of the system at the time of a nighttime failure, for reverting to a then-current job or jobstream restoration point, and for continuing batch processes from that point.

30. The system of claim 29 wherein said second data center comprises a tape silo connected for having data retrieved therefrom for resuming batch processes.

31. The system of claim 29 wherein said second data center comprises a mirror drive connected for having data retrieved therefrom for resuming batch processes.

32. The system of claim 23 wherein the second data center is programmed for determining the state of the system at the time of a nighttime failure, for conducting an IPL of the system, for determining the application queue status of applications at the time of failure, for reporting the determined queue status, and for executing recovery steps in accordance with the determined queue status.

33. The system of claim 23 wherein each disk store configuration comprises multiple disks, and wherein the system is configured for automatically decoupling individual mirror disks of the disk store configuration under programmed control.

34. The system of claim 33 wherein the system is further configured for validating the integrity of mirrored data and the second data center configuration through operation of decoupled individual mirrored disks.

35. The system of claim 33 wherein the system is further configured for recoupling decoupled mirrored disks across the entire mirror disk to configuration under programmed control.

36. The system of claim 23 wherein the mirror disk store configuration at the second data center has multiple disks for backing up at the second data center of local mirror disks in the mirror disk store configuration, to avoid the failure of one or more disks at the second data center.

37. The system of claim 23 wherein the system is configured, once a failure is corrected at the first data center, for reverse writing of the critical on-line data and backing up batch processes from the second data center to the first data center.

38. The system of claim 23 further comprising a monitor for monitoring the system for error messages indicative of errors in writing to and backing up on the mirror disk store configuration and magnetic tape files, and for issuing an alert upon detection of any such error message.

39. The system of claim 23 wherein the first data center is connected to the second data center through a network, and further comprising a utilization monitor for determining the capacity of the network connection between the first data center and the second data center.

40. The system of claim 39 wherein said network is a secure encrypted facility.

41. The system of claim 23 wherein the system is configured for conducting recovery of on-line data and function to the point in time of the failure with no loss of data.

42. The system of claim 23 wherein the system is configured for conducting batch recovery at the second data center in the same manner as batch recovery is conducted at the first data center.

43. The system of claim 23 wherein the system is configured for having customer and internal data transmitted to the first data center also transmitted to and retained at the second data center, thereby eliminating the need for any data retransmission.

44. A system for recovering system functions and data in the event of failure of on-line systems connected to a data center comprising:

a first data center having a predetermined equipment configuration;

a second data center having an equipment configuration which is substantially equivalent to the equipment configuration at the first data center;

a first connection configured for writing critical on-line data in substantially real time to a disk store at the first data center and to a mirror disk store at the second data center;

a second connection configured for backing up critical batch processes during daytime operation of the first data center by storing batch data and processes on a mirror disk store at the second data center; and the second data center being further configured for determining the state of the system at the time of a failure, with a scheduling subsystem which is adapted to run on said equipment at the second data center for determining which on-line systems need to be restarted to provide for point in time recovery of critical on-line data.

45. A system for recovering system functions and data in the event of failure of on-line systems connected to a data center comprising:

a first data center having a predetermined equipment configuration;

a second data center having an equipment configuration which is substantially equivalent to the equipment configuration at the first data center;

a connection configured for backing up critical batch processes during nighttime operation of the first data center by a combination of remote disk mirroring and creating magnetic tape files critical for nightly batch recovery from disk files at the first data center onto a tape silo at the second data center; and the second data center being further configured for determining the state of the system at the time of a failure, with a scheduling subsystem which is adapted to run on said equipment at the second data center for determining which on-line systems need to be restarted to provide for point in time recovery of critical on-line data.

* * * * *